Figure 1:
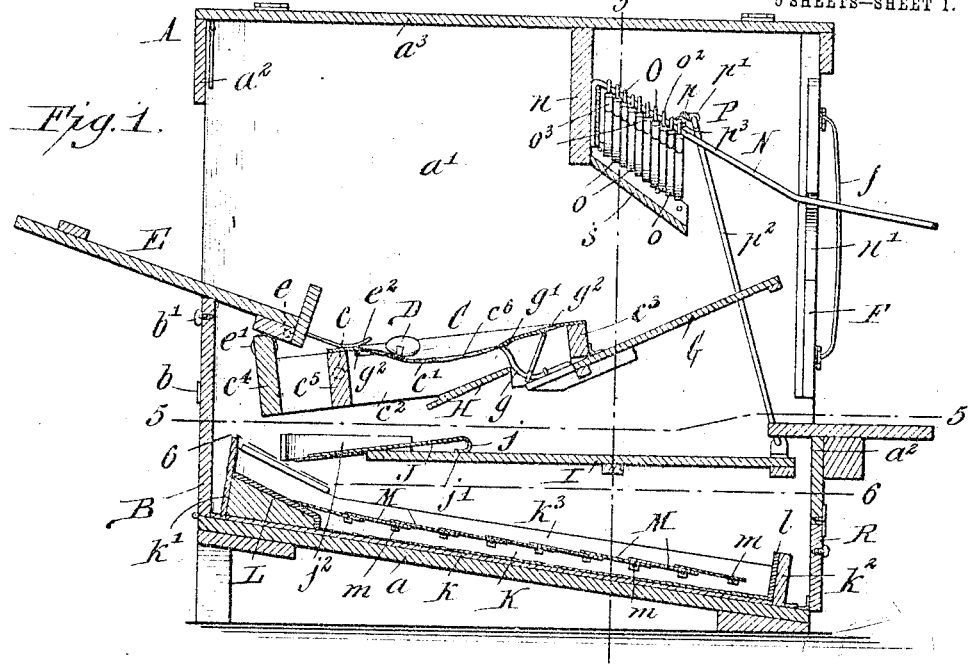

S. A. MERKLEY, F. H. APEL & W. A. MERKLEY.
HEN'S NEST.
APPLICATION FILED JUNE 15, 1907.

960,985.

Patented June 7, 1910.

5 SHEETS—SHEET 1.

Witnesses:
Christ Finkle
Harry D. Rapp.

Stanley A. Merkley,
Frederick H. Apel,
and Wilburn A. Merkley
By Emil Neuhart, Attorney.

Inventors.

S. A. MERKLEY, F. H. APEL & W. A. MERKLEY
HEN'S NEST.
APPLICATION FILED JUNE 15, 1907.

960,985.

Patented June 7, 1910.
5 SHEETS—SHEET 2.

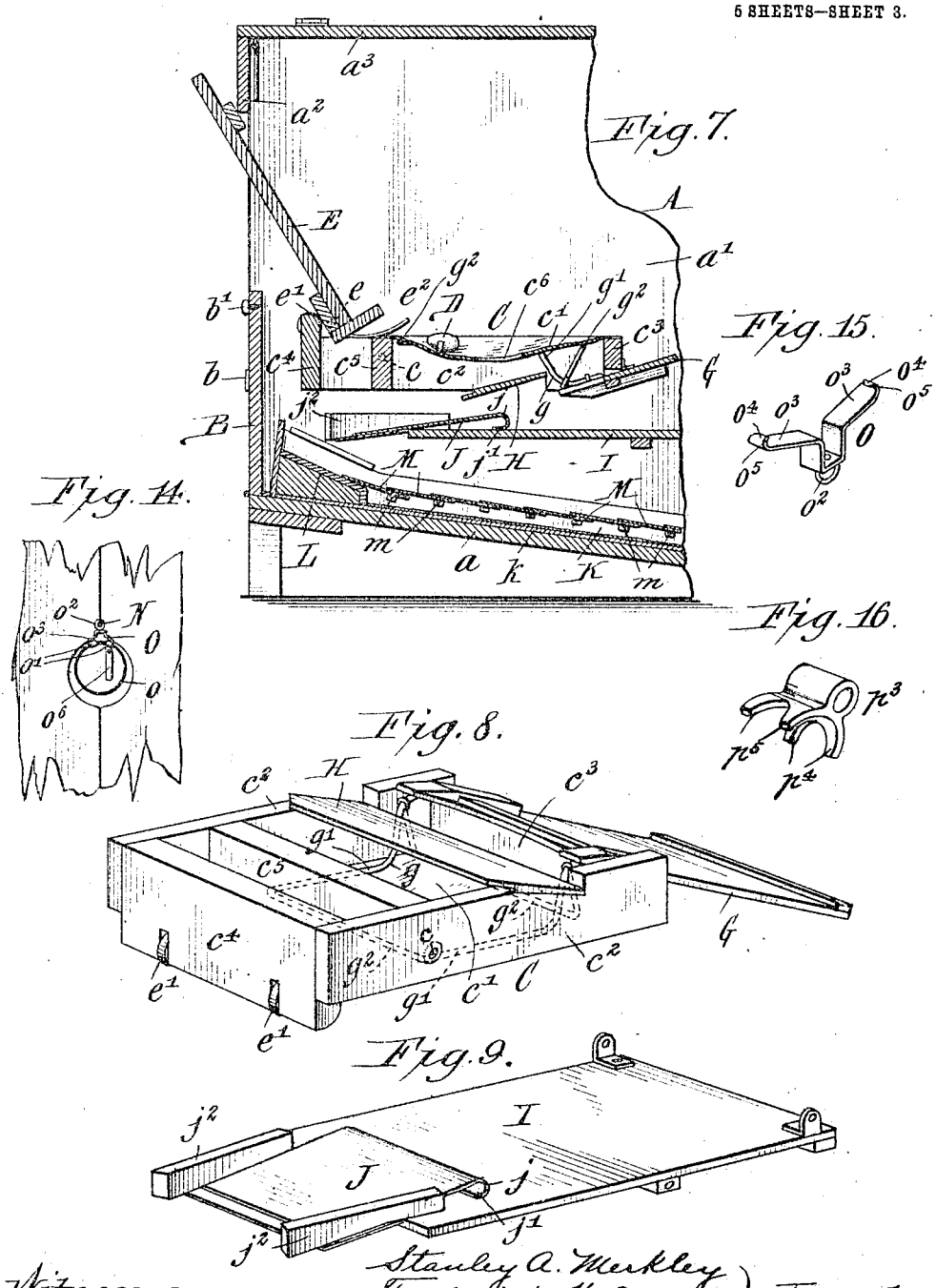

S. A. MERKLEY, F. H. APEL & W. A. MERKLEY.
HEN'S NEST.
APPLICATION FILED JUNE 15, 1907.
960,985.
Patented June 7, 1910.
5 SHEETS—SHEET 4.
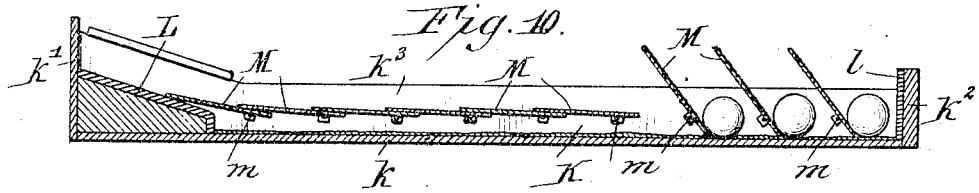
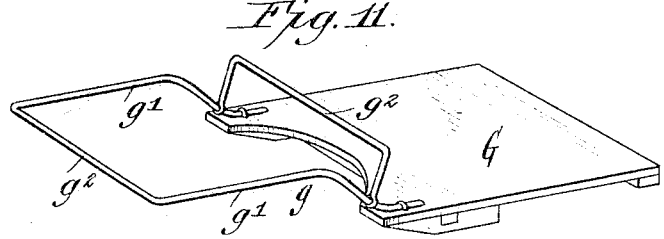
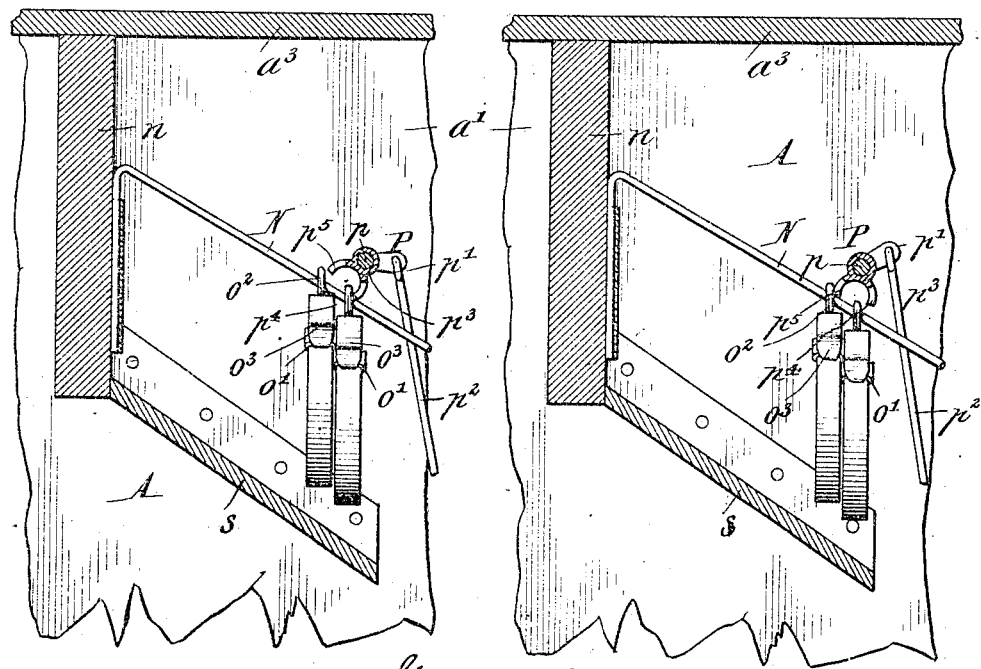

S. A. MERKLEY, F. H. APEL & W. A. MERKLEY.
HEN'S NEST.
APPLICATION FILED JUNE 15, 1907.
960,985. Patented June 7, 1910.
5 SHEETS—SHEET 5.
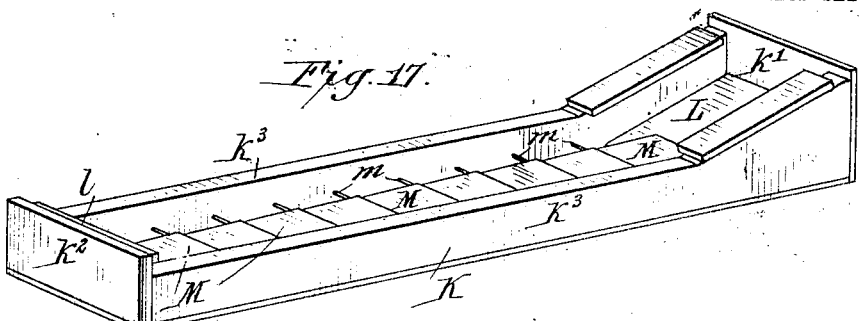
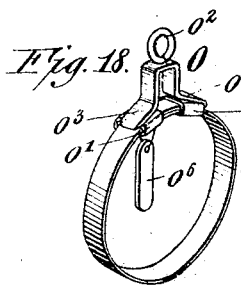
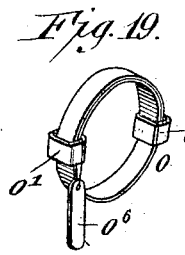
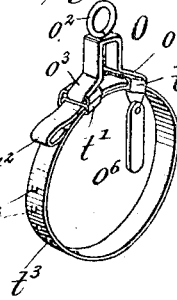
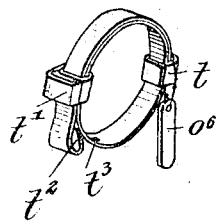
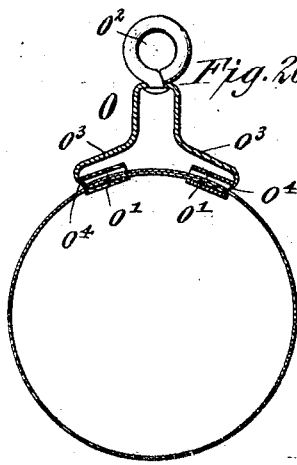
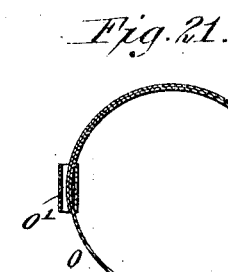
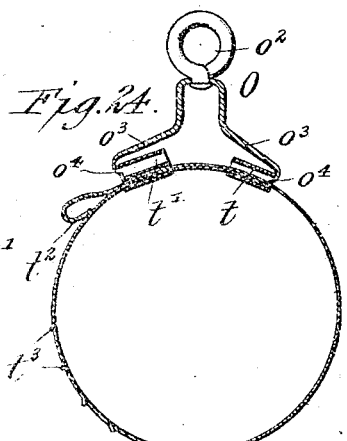
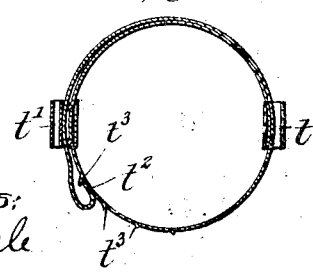
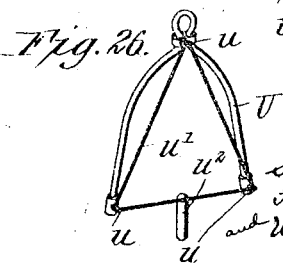
Witnesses:
Christ Feinle
Harry D. Rapp.
Stanley A. Merkley
Frederick H. Apel
and Wilburn A. Merkley,
Inventors.
By Emil Heubart Attorney.

UNITED STATES PATENT OFFICE.

STANLEY A. MERKLEY, OF BUFFALO, FREDERICK H. APEL, OF ATHOL SPRINGS, AND WILBURN A. MERKLEY, OF BUFFALO, NEW YORK.

HEN'S NEST.

960,985.   Specification of Letters Patent.   Patented June 7, 1910.

Application filed June 15, 1907. Serial No. 379,294.

*To all whom it may concern:*

Be it known that we, STANLEY A. MERKLEY, of Buffalo, in the county of Erie and State of New York, FREDERICK H. APEL, of Athol Springs, in said county and State, and WILBURN A. MERKLEY, also of Buffalo, aforesaid, citizens of the United States, have invented certain new and useful Improvements in Hens' Nests, of which the following is a specification.

Our invention relates to improvements in nests for poultry, and the primary object of the same is the production of a nest whereby the laying capacity or qualities of each hen in a hennery can be easily ascertained.

Other objects are the production of a hen's nest whereby the laying of an egg by a hen within the nest can be done under sanitary conditions and wherein a stop-contrivance in an egg-receptacle separates the several eggs deposited therein and prevents the egg being deposited therein coming in contact with the egg last deposited.

Further objects are to provide a series of automatically releasable identifying bands whereby the hens having laid eggs are tagged when passing out of the nest; to so construct the nest that the bands are released successively on delivery of the eggs into the egg-receptacle; and to provide an egg-nest which will lower under the weight of a hen and close the entrance door to the nest.

Still further objects are to so arrange the nest that a hen can pass out through the exit door whether or not it has laid an egg, and whereby in the event of its leaving the nest without having laid an egg, it will not be tagged; to provide means for agitating the bottom of the egg-nest as the hen leaves it, so that assurance is had that the egg will be deposited in the egg-receptacle and also to assure the release of an identifying-band to be automatically placed around the neck of a hen as it passes through the exit door; and to otherwise improve on hens' nests now in use.

With these objects in view, our invention consists in a nest having an egg-nest movable to close the entrance door, an egg-receptacle, a series of identifying bands automatically releasable on delivery of the eggs from the egg-nest to said receptacle, and an exit door normally closed and adapted to be opened by the hens as they leave the nest and so arranged that a band is carried away by the hen as it passes out of the nest after having laid an egg; it also consists in the combination and arrangement of devices, and in the construction, arrangement and combination of parts to be hereinafter described and particularly pointed out in the appended claims.

Figure 2:
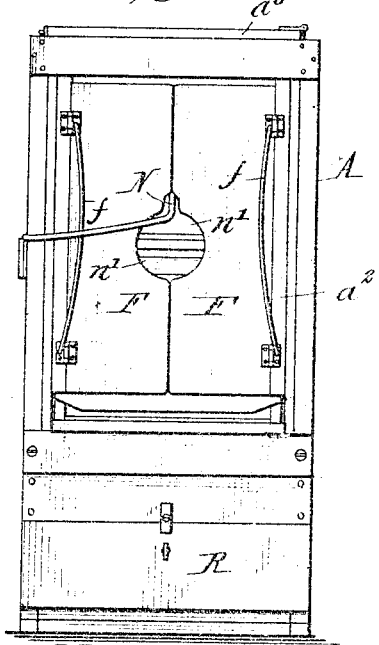
Figure 3:
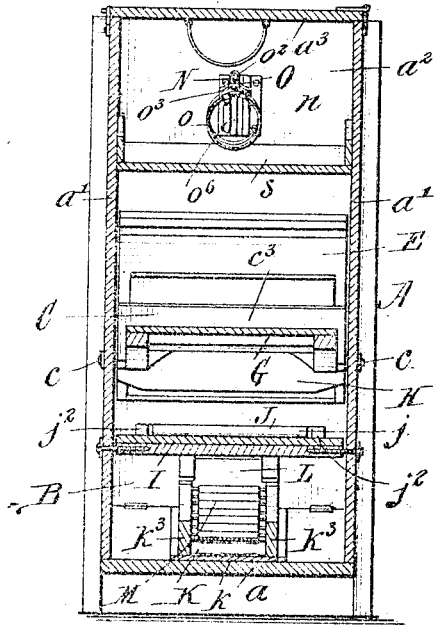
Figure 4:
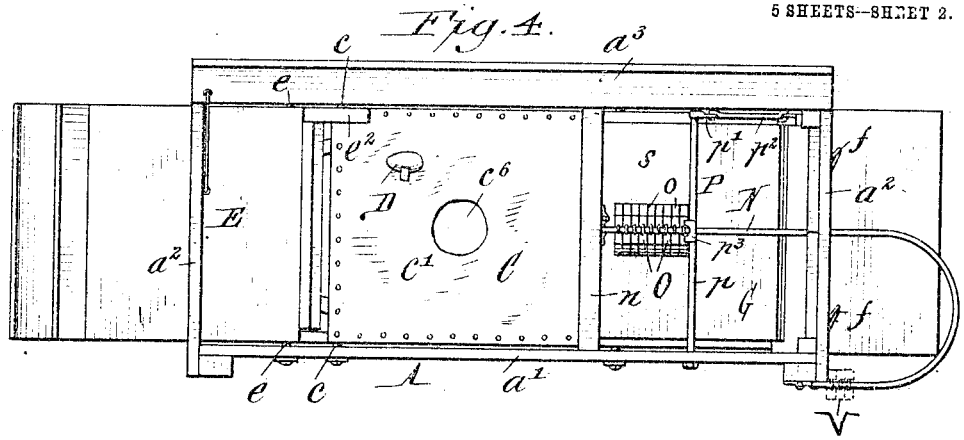
Figure 5:
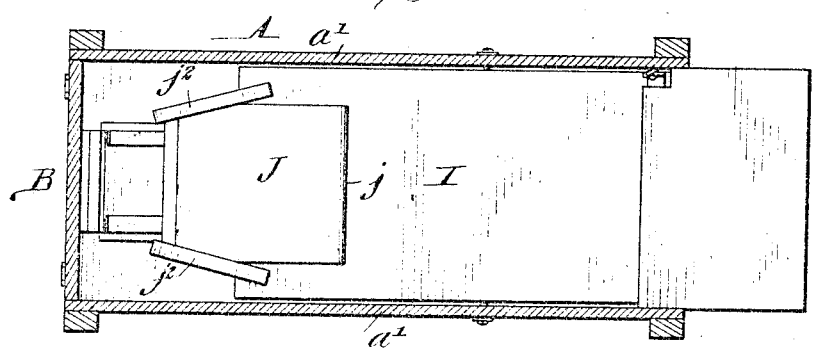
Figure 6:
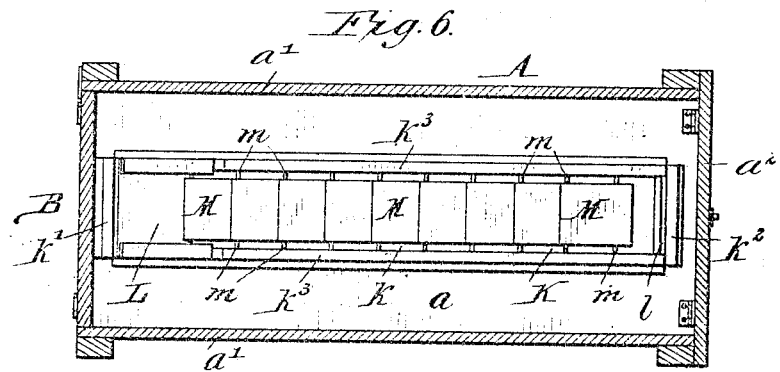

In the drawings, Figure 1 is a central longitudinal section of a nest embodying our invention. Fig. 2 is a view of the exit end of the nest. Fig. 3 is a transverse section taken on line 3—3, Fig. 1. Fig. 4 is a plan view of the nest with the cover open. Fig. 5 is a horizontal section taken on line 5—5, Fig. 1. Fig. 6 is a horizontal section taken on line 6—6, Fig. 1. Fig. 7 is a section similar to Fig. 1, through a portion of the nest, the egg-nest being shown in the position it assumes under the weight of a hen, and the entrance door being closed thereby. Fig. 8 is a detached inverted perspective view of the nest proper and its attached agitating-device. Fig. 9 is a detached perspective view of the balance-member whereby the identifying bands are released. Fig. 10 is an enlarged longitudinal section through the egg-receptacle, showing several of the automatically actuated stops between eggs deposited therein. Fig. 11 is a detached perspective view of the agitating-device for moving the flexible bottom of the egg-nest. Figs. 12 and 13 are vertical sections showing the band releasing-device in different positions. Fig. 14 is a view showing a released identifying-band against the exit door. Fig. 15 is a perspective view of one of the hangers for supporting the identifying-bands. Fig. 16 is a detached perspective view of the band releasing-member. Fig. 17 is a perspective view of the egg-receptacle removed from the nest. Fig. 18 is a perspective view of the one of the tagged identifying-bands in expanded condition with a combined hanger and retainer whereby it is supported and retained in expanded condition. Fig. 19 is a perspective view of the same in contracted condition and released from its hanger. Fig. 20 is an enlarged section of a band in expanded condition and the hanger and retainer therefor. Fig. 21 is an enlarged section of a band in contracted condition. Figs. 22 and 23 are perspective views of a modified from of identifying-band in expanded and contracted condition, respectively. Figs. 24 and 25 are enlarged sections of the same. Fig. 26 is a perspective view of a still further modified form of identifying-band and hanger.

Referring now to the drawings in detail, like letters of reference refer to like parts in the several figures.

A represents the nest casing comprising an inclined bottom $a$, side walls $a^1$, end walls $a^2$, and a hinged cover $a^3$ whereby access may be had to the interior. One end wall has a door B which is hinged at its lower edge to the bottom of the casing and is normally closed and retained in closed position by a turn-button $b$, or in any other manner; it having a handle $b^1$ for conveniently opening it.

C designates the egg-nest comprising an open frame pivotally secured between its ends to the sides of the casing, as at $c$, and a flexible bottom or hen-rest $c^1$. Said frame is normally held in an inclined position, as shown in Fig. 1, and it comprises longitudinally disposed side-bars $c^2$, transverse end bars $c^3$, $c^4$, the latter having its upper edge in a plane above the upper edges of the side bars, and an intermediate transverse bar $c^5$. The flexible bottom on hen-rest $c^1$ has its marginal portions secured to the side-bars, the end-bar $c^3$ and the intermediate bar $c^5$ so that it forms a suspended-bed and it has centrally an opening $c^6$ through which the eggs pass that are laid thereon. A decoy egg D is fastened to the bottom or hen-rest to entice the hens into the nest.

A trap-door E is provided at the entrance end of the casing and is pivotally secured to the sides thereof, as at $e$; it being normally in the position shown in Fig. 1, so that it forms a platform at the entrance to the nest. Between its pivotal point $e$ and its outer free end, the end bar $c^4$ of the egg-nest bears, said end bar having friction-rollers $e^1$ at this point to assure positive and free action between these parts. A flat spring $e^2$ is secured to the inner end of the entrance trap door and bears against the top of the nest frame, tending to retain said door in its open position when relieved of the weight of a hen.

In entering the casing, the hen first lands upon the platform or entrance door, and then enters the egg-nest, and in so doing its weight lowers the nest to the position shown in Fig. 7, causing the outer end to rise and act upon the platform or door to close the entrance, thus preventing its leaving the nest through the entrance opening. After the hen has laid an egg, it leaves the nest by passing through the exit-doors F at the opposite end of the casing. It must, however, step upon a platform G pivotally attached to the end-bar $c^3$ of the nest frame, which platform is depressed by the weight of the hen and causes an agitating-frame $g$ secured thereto to raise or shake the nest-bottom, thereby assuring a positive delivery of the newly-laid egg through the opening in said bottom. Said agitating-frame is preferably made of wire having longitudinal members $g^1$ and cross-members $g^2$ which surround said opening. The eggs passing through said opening land upon an inclined guide-board H arranged transversely and secured to the side-bars of the egg-nest. From the guide-board H they roll upon a balance-device I, herein shown as a longitudinally disposed board pivotally secured between its ends to the sides of the casing and having a cushioning-device J formed by curving a thin sheet of tin or the like upon itself, as at $j$, and secured at its incurved end $j^1$ to said board. Converging bars $j^2$ are secured to said board on opposite sides of said cushioning-device to direct the eggs into an egg-receptacle K resting upon the inclined bottom of the casing and removable through the door B at the entrance end of the casing. By reason of the egg-receptacle resting upon the inclined bottom, it is given the desired inclination to direct the eggs delivered therein toward the exit end of the casing. Said receptacle comprises a bottom $k$, end walls $k^1$, $k^2$, and parallel side walls $k^3$ which guide the eggs toward the exit end of the casing. At a point directly beneath the discharge end of the balance-device an elevated and cushioned platform L is provided in the egg-receptacle onto which the eggs drop from the balance-device. A series of overlapping stops M are pivotally secured near one of their ends to the side-walls of the receptacle, as at $m$, the first of these rests upon the platform L and each succeeding stop rests upon the stop directly in advance. The first egg dropping upon the platform L rolls over the successive stops—which normally assume a position approximately parallel with the bottom of the egg-receptacle—until it strikes against the end wall $k^2$ of the receptacle, which is cushioned, as at $l$, and as it reaches this point, its weight on the end stop in rear of its pivotal point causes said stop to be swung into a position approaching a vertical plane, as shown in Fig. 10. The next egg delivered into the receptacle rolls over the remaining overlapping stops until it strikes the end stop, when it acts against the second-last stop in a similar manner and elevates the same so that it also acts as a stop for the next egg delivered into the egg-receptacle; this being continued until the receptacle is removed and emptied or until all the stops are elevated. We might here state that as no provision is made to close the entrance against a hen after the egg-receptacle is filled, we make the latter of sufficient size to receive all the eggs that can be laid in a single day by a given number of hens, and that additional nests are needed in proportion to the number of hens in a hennery.

As hereinbefore stated, the delivery of an egg from the egg-nest controls the mechanism for tagging the hens when leaving the nest after having laid an egg. This mechanism consists of an inclined guide-wire N affixed at one end to a cross-piece $n$ secured to the sides of the casing, and extending out through an opening formed by coincident notches $n^1$ in the exit doors F, thence being curved laterally outside of the casing and recurved for connection to the casing. Said exit doors are hinged to swing in opposite directions and they are maintained in closed position by springs $f$.

A series of hangers O are held on the guide-wire N and each has a contractible identifying-band $o$ held thereon. Each of these bands has a numbered tag $o^6$ affixed thereto, or if desired, the bands may be differently numbered and the tags dispensed with. A releasing-device P is provided to successively release said bands and allow them to slide on the guide-wire until they come in contact with the exit-doors. This releasing-device comprises a rock-shaft $p$ having its ends journaled in the side walls of the casing, a rock-arm $p^1$ at one end of said shaft, a rod $p^2$ connecting said arm with the rear end of the balance-device J, and a U-shaped releasing-member $p^3$ secured to said rock-shaft and having two pairs of arms $p^4$, $p^5$, straddling the guide-wire and so arranged that the arms $p^4$ will release the first band of the series or the first of the remaining-bands of the series, as the case may be, when the rear end of the balance-device is elevated, while the arms $p^5$ momentarily hold the next band of the series against movement. When the balance-device returns to its normal position, which occurs immediately an egg rolls therefrom, the rock-shaft $p$ also returns to its normal position, in consequence of which the arms $p^5$ of the releasing-member are disengaged from the band which they momentarily engaged, and said band, which now becomes the first of the remaining bands of the series, is engaged by the arms $p^4$ and held in position until another egg is delivered from the egg-nest onto the balance-device, when it also rides down the guide-wire N.

For convenience in cleaning the nest, we provide a door R at the exit end of the casing.

Each of the identifying bands is made of a flat tempered steel strip coiled upon itself to a size that it will fit loosely around the neck of a hen, yet not so loosely as to be possible to slip it over the head of the hen without expanding it. Each end of the strip has a loop $o^1$ which surrounds a portion of the band between its ends. Normally these bands are in contracted condition but when applied to the hangers O, they are expanded. Each of the hangers consists of an eye $o^2$ which fits onto the guide-wire N and a band-holder having two diverging arms $o^3$ provided with inturned ends $o^4$ that engage the loops $o^1$ of the coöperating band when expanded and retain the band in expanded position. The inturned ends of the band-holding arms are tapered and the edges thereof beveled, as at $o^5$, so that the bands are easily released by slight rearward pressure on the latter, such as a hen would exert when passing its head through the band and attempting to leave the nest with the same.

Each band, when released by the releasing-device P, rides down the wire and is positioned inside of the exit-doors so that it registers with the opening formed by the notches $n^1$ in the edges of said doors. A hen in leaving the nest, passes its head through said opening and through the band in rear of the opening, and as it pushes open the door it carries the band and its hanger with it until it reaches the curved portion of the guide-wire, at which point the hanger is held against further movement in the direction in which the hen is traveling and consequently the band becomes released from the hanger and immediately assumes its normal or contracted condition, and is carried away around the neck of the hen. Owing to the band being numbered or having a numbered tag secured thereto, it is an easy matter to record in a book kept for that purpose, the number of eggs laid by each hen in a certain period of time. It is, of course understood, that the hens are provided with numbered leg-bands or other identifying means. In order that the hens do not come in contact with the series of bands, or the remaining-bands of the series, as the case may be, a guard $s$ in the form of an inclined transversely disposed board is located beneath the bands, as shown in Figs. 1 and 3.

In Figs. 22 to 25, we have shown a modified form of identifying-band, in which a strip of tempered steel is coiled upon itself and has at one end a loop $t$ and near its other end a loop $t^1$; said last-mentioned end being recurved, as at $t^2$ to engage a series of teeth $t^3$ formed on the band by stamping them from the metal strip. The loops $t$, $t^1$, surround the metal strip between its ends and are engaged by the diverging arms of a hanger O similar to the manner of engaging the loops of the band $o$. By reason of the recurved end $t^2$ of the band engaging the teeth $t^3$, it is impossible to remove the same from the neck of a hen without disengaging said end from the tooth engaged thereby.

In Fig. 26 a further modification of an identifying band is shown. In this instance, the hanger designated U has outstanding pins $u$ on which is held an elastic band $u^1$ having a numbered tag $u^2$ secured thereto.

Briefly stated, the operation is as follows,—a hen entering the nest, closes the entrance door through the lowering of the egg-nest induced by the weight of the hen. After having laid an egg, the hen in leaving the nest steps upon the pivoted platform G, which actuates the suspended bed or bottom of the egg-nest and assures delivery of the newly laid egg onto the balance-device if not previously delivered thereon; from the balance-device the egg passes into the egg-receptacle. The delivery of the egg onto the balance-device causes the rear end of the latter to be elevated which actuates the band releasing-device and allows the first of the series of identifying-bands or the first of the remaining bands of the series, as the case may be, to ride down the guide-wire N and position itself in rear of the exit-doors and in registration with the opening therein. The hen in passing out, takes the released band with it, leaving the hanger to ride down and around the curved portion of the guide-wire to a position where it is out of the way, as shown in dotted lines at V, Fig. 4. If, however, a hen leaves the nest without laying an egg, the balance-device is not actuated, and consequently no band is released. This permits the hen to pass without taking a band with it. At the end of the day, the eggs may be removed from the egg-receptacle, the number therein must agree with the number of hangers hanging on the guide-wire outside the nest. The numbered or tagged identifying-bands may be removed from the hens, the designating-member of the hen from which each band is taken may be noted; and in a book kept for that purpose, record may be made of the hens having laid during the day. In this manner the laying capacity or qualities of each individual hen may be ascertained, and the eggs of any desired hen used for hatching. If desired the hangers for supporting the identifying-bands may be numbered to correspond to the number of the band which each supports, and when this done, the particular egg laid by each hen may be ascertained; the first egg deposited being that of the hen having the band numbered to correspond to the number of the first hanger of the several hanging on the wire N outside of the nest.

Our invention is susceptible to various changes in form, construction and arrangement of parts without departing from the spirit thereof or sacrificing any of its advantages.

Having thus described our invention, what we claim is—

1. The combination with a casing, of an egg-nest within the casing, and means to tag a hen leaving the casing only after having laid an egg.

2. The combination with a casing, of an egg-nest in said casing, and means to tag a hen controlled by an egg laid by said hen.

3. The combination with a nest, of means for tagging a hen controlled by an egg laid in said nest.

4. The combination with a nest, of means for tagging a hen as it leaves said nest, said means being actuated only after the hen has laid an egg.

5. The combination with a casing, of a nest within the casing, an egg-receptacle, and means for tagging a hen as it leaves the casing, said means being actuated on delivery of an egg from said nest to the egg-receptacle.

6. The combination with a casing having an entrance and an exit, an egg-nest within the casing, a series of identifying-devices, and means for successively releasing said devices to be carried away by the hens as they leave the casing, said releasing-means being actuated by the eggs laid within said casing.

7. The combination with a casing having an entrance and an exit, an egg-nest within the casing, an egg-receptacle into which the eggs are delivered from said egg-nest, a series of identifying-devices, and means for successively releasing said identifying devices so as to position them in the path of the hens leaving the casing, said releasing means being actuated by the delivery of the eggs from the egg-nest to the egg-receptacle.

8. The combination of an egg-nest, and an egg-receptacle having a series of stop-plates which are elevated in succession to form stops for the eggs delivered into said egg-receptacle.

9. The combination of an egg-nest, and an egg-receptacle having side walls and a series of stop-plates, each of the latter being pivoted between its ends and adapted to be elevated to form stops for the eggs delivered into said egg-receptacle.

10. The combination of an egg-nest, and an inclined egg-receptacle having a series of overlapping stop-plates over which the eggs roll, said plates being pivoted between their ends and adapted to be elevated successively by the successive eggs delivered into said receptacle so as to form stops for the eggs.

11. The combination of an egg-nest, and an inclined egg-receptacle having side walls, end walls and stop-plates pivoted between their ends to said side walls and overlapped to form an egg-runway, one of said stop-plates being elevated on delivery of each egg into the egg-receptacles to form a stop for the next egg delivered thereto.

12. The combination with a casing, of an egg-nest within the casing, an egg-receptacle into which the eggs are delivered from said egg-nest, a balance-device between the egg-nest and the egg-receptacle actuated by the eggs as they pass from the egg-nest to said receptacle, a series of identifying-devices normally held out of the path of the hens as they leave the casing, and means actuated by said balance-device to successively release said identifying-devices to allow them to move into the path of the hens to be carried away with them as they leave the casing.

13. The combination with a casing, of an egg-nest within the casing, an egg-receptacle, a balance-device actuated by the eggs passing from the egg-nest to said receptacle, a rock-shaft, connection between said rock-shaft and said balance-device, a U-shaped release-member on said rock-shaft, an inclined guide-wire, a series of identifying-devices held on said guide-wire and adapted to be released successively by said release-member so as to ride down said inclined guide-wire and be positioned in the path of the hens leaving the casing.

14. The combination of a nest having an opening in its bottom, and a cushion onto which the eggs are delivered, said cushion being formed of a thin sheet of metal curved upon itself and suitably fastened.

15. The combination of a nest comprising a frame and a flexible suspended bottom having an opening, and an agitating-device acting against said bottom to assure delivery through said opening of an egg laid thereon.

16. The combination of a nest comprising a frame and a flexible bottom having an opening, a platform pivotally attached to said frame, and an agitating-device secured to said platform and acting against the underside of said bottom.

17. The combination of a nest comprising a frame and a flexible bottom having an opening, a pivoted platform, and an agitating-device actuated by said platform and acting against said bottom.

18. The combination of a nest comprising a frame and a loose and flexible bottom secured to said frame and having an opening, and an agitating-device comprising longitudinal and cross-members which surround the opening in said bottom, and means for causing said agitating-device to act against said bottom when a hen leaves the nest.

19. The combination with a casing having an entrance and an exit, an egg-nest movable by the weight of a hen, a closure for said entrance actuated by the movement of said nest to cause it to close said entrance, a closure for said exit, a guide-wire, and an identifying-device on said wire comprising a hanger and a band supported by said hanger and releasable therefrom, said band being adapted to be released from said hanger and be carried away by a hen as it leaves the casing.

20. The combination with a casing having an entrance and an exit, an egg-nest movable by the weight of a hen, a closure for said entrance actuated by the movement of said nest to cause it to close said entrance, a closure for said exit, a guide-wire, and an identifying-device comprising a hanger and an expansible band held in expanded condition on said hanger and adapted to be released from said hanger and assume its normal condition, said band being released by a hen as it leaves the casing.

21. The combination with a casing, an egg-nest, and means to tag a hen as it leaves the casing, comprising a hanger and an identifying-band formed of a strip of tempered metal coiled to permit of expansion and having loops at the ends of the strip surrounding intermediate portions thereof, said loops being engaged by the hanger.

22. The combination with a casing, an egg-nest, and means to tag a hen as it leaves the casing comprising a hanger having diverging arms tapered and directed inward at their ends and an identifying-band formed of a strip of tempered metal coiled to permit of expansion and having loops at the ends of the strip surrounding intermediate portions thereof, said loops being engaged by the hanger when the band is in expanded condition.

In testimony whereof, we have affixed our signatures in the presence of two subscribing witnesses.

STANLEY A. MERKLEY.
FREDERICK H. APEL.
WILBURN A. MERKLEY.

Witnesses:
ELLA C. PLUECKHAHN,
CHRIST FEINLE.